United States Patent
Straub et al.

(10) Patent No.: US 7,194,079 B1
(45) Date of Patent: Mar. 20, 2007

(54) METHODS AND APPARATUS FOR FORWARDING FACSIMILES BY PHONE AND/OR E-MAIL

(75) Inventors: Michael P. Straub, Colts Neck, NJ (US); William A. Kay, Glendora, NJ (US)

(73) Assignee: Verizon Services Corp., Arlington, VA (US)

( * ) Notice: Subject to any disclaimer, the term of this patent is extended or adjusted under 35 U.S.C. 154(b) by 744 days.

(21) Appl. No.: 09/841,415

(22) Filed: Apr. 24, 2001

(51) Int. Cl.
H04M 3/436 (2006.01)
H04M 3/54 (2006.01)
H04M 11/06 (2006.01)
H04N 1/00 (2006.01)

(52) U.S. Cl. .................. 379/211.02; 358/402; 358/407; 379/100.08; 379/100.09; 379/100.13; 379/212.01; 379/905

(58) Field of Classification Search .............. 358/402, 358/407; 379/93.24, 100.08, 100.09, 100.13, 379/211.02–211.04, 905, 908, 212.01, 213.01, 379/214.01
See application file for complete search history.

(56) References Cited

U.S. PATENT DOCUMENTS

| | | | |
|---|---|---|---|
| 5,247,571 A | | 9/1993 | Kay et al. |
| 5,448,626 A | * | 9/1995 | Kajiya et al. ............ 379/88.13 |
| 5,465,295 A | * | 11/1995 | Furman .................. 379/221.14 |
| 5,475,748 A | | 12/1995 | Jones |
| 5,592,473 A | | 1/1997 | Matern et al. |
| 5,615,253 A | | 3/1997 | Kocan et al. |
| 5,802,160 A | | 9/1998 | Kugell et al. |
| 5,915,008 A | | 6/1999 | Dulman |
| 5,920,404 A | * | 7/1999 | Weiser ....................... 358/434 |
| 6,020,980 A | * | 2/2000 | Freeman ..................... 358/402 |
| 6,356,356 B1 | * | 3/2002 | Miller, Jr. et al. ......... 358/1.15 |
| 6,510,211 B1 | * | 1/2003 | McAfee et al. ........ 379/100.09 |
| 6,625,642 B1 | * | 9/2003 | Naylor et al. ............... 709/206 |
| 6,694,004 B1 | | 2/2004 | Knoerle et al. |
| 6,697,478 B1 | | 2/2004 | Meldrum et al. |
| 6,956,663 B1 | * | 10/2005 | Iida ........................... 358/1.15 |
| 2003/0235283 A1 | | 12/2003 | Knoerle et al. |

* cited by examiner

Primary Examiner—Harry S. Hong

(57) ABSTRACT

Improved call forwarding methods and apparatus are described. Dialing of multiple call forwarding locations in parallel is supported. Distinguishing between fax and voice calls and using different forwarding numbers for each type of call is also supported. Forwarding of facsimiles by E-mail as an alternative or in addition to forwarding by phone is also supported. Call forwarding security features such as requiring an answering party to enter a PIN before being connected to the calling party are also described. The call forwarding services can be implemented in the PSTN using AIN techniques avoiding the need to purchase or upgrade customer premise equipment to receive the call forwarding service. Alternatively, the call forwarding methods may be implemented using customer premise equipment such as a PBX.

26 Claims, 7 Drawing Sheets

METHODS AND APPARATUS FOR FORWARDING FACSIMILES BY PHONE AND/OR E-MAIL

FIELD OF THE INVENTION

The present invention is directed to call processing and, more particularly, to voice and fax call forwarding methods and apparatus.

BACKGROUND OF THE INVENTION

With advances in notebook computers, cell phones, and transportation individuals in modern society are becoming ever more mobile. As a result, telephone service users often find themselves working from any one of a plurality of locations. For many individuals, it is important that they be able to receive calls regardless of their location. This has prompted the widespread use of mobile telephones and call forwarding services. Because of power limitations and other limitations on the functionality available from mobile phones, people often find themselves with a business, e.g., land line, telephone number and a mobile telephone number. When away from their office phones, such individuals often choose to have their calls forwarded to a telephone number corresponding to the place where they will be located or to have their calls forwarded to a mobile telephone number.

Because individuals may be at different locations at different times, some known call forwarding services offer the user the option of entering a list of telephone numbers. The telephone numbers corresponding to various locations where the individual may be located. In the known system, calls are made to each of the listed numbers in sequence in an attempt to forward a call. In the event that a call goes unanswered for a preselected period of time, the next telephone number in the call forwarding list is called. While sequential dialing of call forwarding numbers allows multiple locations to be called in an attempt to reach the original called party, it can be time consuming to check several locations in this manner. This is because the call forwarding service waits for a response before trying the next number in the list of call forwarding numbers. Often a calling party may not be patient enough to wait while several locations are checked in sequence.

While call forwarding works well on telephone lines which are used for voice calls, in some businesses telephone lines are used for both voice and fax calls. This is more commonly the case in home offices where customer premise equipment, e.g., a fax/voice call switching device, is used to determine whether an incoming call is a fax or voice call and to connect the call to a telephone in the case of a voice call or fax device in the case of a fax call. While the shared use of a telephone line for voice and fax operations avoids the cost associated with maintaining separate telephone lines, it often presents a dilemma in the case of call forwarding. In many cases the user of the shared voice/fax line would like to have voice calls forwarded, e.g., to a mobile phone or another telephone while away from the office but doesn't want the fax calls to be forwarded. Alternatively, the user of the fax/voice line may want to forward both voice and fax calls but wants the fax calls forwarded to a different telephone number than the voice calls. For example, it may be desirable to forward voice calls to a mobile telephone and fax calls to the telephone number of a fax machine located at a hotel where the user is staying.

Fax calls present another problem with regard to an individual who is traveling. While people often carry cell phone and notebook computers when traveling and know the voice telephone number of a location they will be staying at, it is much less common for a traveler to bring a portable fax machine or to know the fax number of locations they will be staying at. Accordingly, the forwarding of fax call to people who are traveling can present several problems.

One disadvantage of existing call forwarding services is that they simply forward a call without any way of restricting who at the location to which the call is forwarded may answer the call. This often results in calls being answered by the wrong party and/or calls being answered in an inappropriate manner. For example, forwarded business calls may not be answered with the usual business greeting and/or they may be answered by someone who is totally unconnected with the business being called.

In view of the above discussion it is apparent that there is a need for improving existing call forwarding services.

From a telephone customer perspective, it is often easier to purchase a telephone service, e.g. a call forwarding service, from a telephone company rather than implement such a service using customer premise equipment, e.g., private branch exchange (PBX) equipment. In this manner, a customer can avoid the cost and expense associated with purchasing, installing, and maintaining telephone equipment. Thus, while improved call forwarding services may be implemented using customer premise equipment, it would be desirable that in at least some cases, improved call forwarding services could be provided without requiring the purchase of telephone equipment by a call forwarding service user.

In order to provide enhanced telephone services, many telephone companies now implement a telephone communications network as an Advanced Intelligent Network (AIN) which has made it easier to provide a wide array of previously unavailable telephone services. In an AIN system, telephone central offices, each of which serves as a signal switching point (SSP), detect one of a number of call processing events identified as AIN "triggers". SSPs are often implemented as central office telephone switches. An SSP which detects an AIN trigger suspends processing of the call which activated the trigger, compiles a call data message and forwards that message via a common channel interoffice signaling (CCIS) link to a database system, such as a Service Control Point (SCP). AIN messages are normally SS7 signaling based messages which are TCAP (technical capability application protocol) compliant.

A SCP can be implemented as part of an integrated service control point (ISCP). If needed, the SCP can instruct the central office SSP at which the AIN trigger was activated to obtain and forward additional information, e.g., information relating to the call. Once sufficient information about the call has reached the SCP, the SCP accesses stored call processing information, e.g., call processing records (CPRs) to generate from the received message data, a call control message. The call control message is then used to instruct the central office on how to process the call which activated the AIN trigger. As part of the call control message, an SCP can instruct the central office to send the call to an outside resource, such as an intelligent peripheral (IP) using, e.g., a send to outside resource (STOR) instruction. IPs are frequently coupled to SSPs to provide message announcement capabilities, voice recognition capabilities and other functionality which is not normally provided by the central office switch. The control message is normally communicated from the ISCP to the SSP handling the call via the CCIS link. Once received, the SCP processes the call in accordance with the instructions received in the control message.

One service which can be implemented with AIN functionality is Centrex. Centrex takes a group of normal telephone lines and provides call processing to add business features to the otherwise standard telephone lines. For example, Centrex adds intercom capabilities to the lines of a specified business group so that a business customer can dial other stations within the same group, e.g., lines belong to the same company, using extension numbers such as a two, three, or four digit numbers, instead of the full telephone number associated with each called line. Other examples of Centrex service features include call transfer between users at different stations of a business group, and a number of varieties of call forwarding. Thus, Centrex adds a bundle of business features on top of standard telephone line features without requiring special equipment, e.g., a private branch exchange (PBX) at the customer's premises. U.S. Pat. No. 5,247,571, which is hereby expressly incorporated by reference, describes in detail a Wide Area Centrex system implemented using AIN techniques.

In order to make it easier to manage various Centrex services, e.g., call forwarding services, it has been suggested that users of Centrex services be allowed to manage various service features from their computers via the Internet. U.S. Pat. No. 5,915,008 discusses the use of a server accessible via the Internet, to allow users limited control of AIN based telephone services from their computers.

In view of the above discussion, it becomes apparent that there is a need for improved call forwarding methods and apparatus that would allow a number of locations to be checked for the call forwarding service subscriber in a reasonable amount of time. There is also a need for methods and apparatus that can support forwarding of voice calls while providing for the separate forwarding or other processing of fax calls received on the same telephone line as the voice calls which are to be forwarded. It is also desirable that some form of security be available to prevent individuals other than the intended call recipient from receiving and/or answering forwarded calls. In addition, it is desirable that, at least in some cases, improved call forwarding services be capable of being provided without requiring a subscriber to purchase and/or install new telephone equipment. It is also desirable that at least some improved call forwarding service be capable of being provided to Centrex subscribers. There is also a need for some method of forwarding faxes to mobile subscribers who are not readily accessible to a fax machine capable of receiving and printing faxes.

SUMMARY OF THE INVENTION

Voice and fax call forwarding methods and apparatus are described. In accordance with various embodiments of the present invention, call forwarding locations are dialed in parallel. In this manner multiple locations can be checked for the call forwarding service subscriber in a fraction of the time that would be required if each location were checked sequentially. To avoid making an unnecessarily large number of telephone calls as part of a call forwarding operation, in some embodiments one or more call forwarding telephone numbers are sequentially dialed prior to resorting to parallel dialing. In such embodiments, many forwarded calls may be answered without resorting to parallel dialing with parallel dialing. However, when the sequential calls do not result in an answer, parallel dialing still provides the benefit of allowing more locations to be checked in a reasonable amount of time than would be possible if only sequential dialing was used.

In order to avoid calls being forwarded to, or answered by, the wrong party a call forwarding service subscriber can require entry of a PIN or other code before an incoming call will be forwarded, e.g., completed, to an answering location. In this manner, the likelihood of a calling party being connected to a wrong party because of a call forwarding operation is greatly reduced.

Various features of the present invention are directed to the forwarding of fax calls. Fax calls can be forwarded using a phone number specifically provided by the subscriber for the forwarding of fax calls. Fax calls can also be answered, the fax stored to an electronic file and then forwarded to a service subscriber by E-mail. In this manner a subscriber can receive and view faxes originally directed to a telephone line using a notebook computer to first receive E-mail messages including forwarded faxes and then to display the faxes received by E-mail.

In accordance with another feature of the present invention, a call forwarding service subscriber can designate fax calls on a telephone line to be treated differently from voice calls. In one particular embodiment, the system of the present invention checks to determine if an incoming call is a fax or voice call. Voice calls are forwarded using one or more voice call forwarding telephone numbers provided by the forwarding service subscriber. Fax calls, on the other hand, are either 1) forwarded using a fax forwarding telephone number; 2) forwarded by E-mail and/or 3) received, stored, and forwarded to the subscriber at a later time, e.g., when call forwarding is deactivated. Deactivating call forwarding may indicate, e.g., that the subscriber has returned to his/her office and is therefor ready to receive and/or process faxes.

The new and improved call forwarding services of the present invention can be implemented in the telephone network using AIN functionality. Thus, the call forwarding services of the present invention can be implemented without requiring a service subscriber to purchase and/or install customer premise equipment. In addition, since the call forwarding services can be implemented using AIN functionality, they can be provided as part of a Centrex service if desired. Alternatively, the call forwarding methods of the present invention can be incorporated into customer premise devices, e.g., PBX's, sometimes by simply upgrading the software included in a PBX to implement some or all of the improved call forwarding techniques of the present invention.

While numerous features of the present invention are described in the following pages, in the context of an exemplary Centrex embodiment it is to be understood that the features of the present invention are not necessarily limited to a Centrex embodiment.

Various additional features and advantages of the present invention will be apparent from the detailed description which follows.

DETAILED DESCRIPTION

As discussed above, the present invention is directed to methods and apparatus for forwarding voice and fax calls. The call forwarding services of the present invention may be provided as stand-alone services, as part of a Centrex service, or as part of another telephone service package. Alternatively, the call forwarding methods of the present invention can be implemented using customer premise equipment, e.g., a PBX programmed to implement the call forwarding techniques of the present invention.

Figure 1:
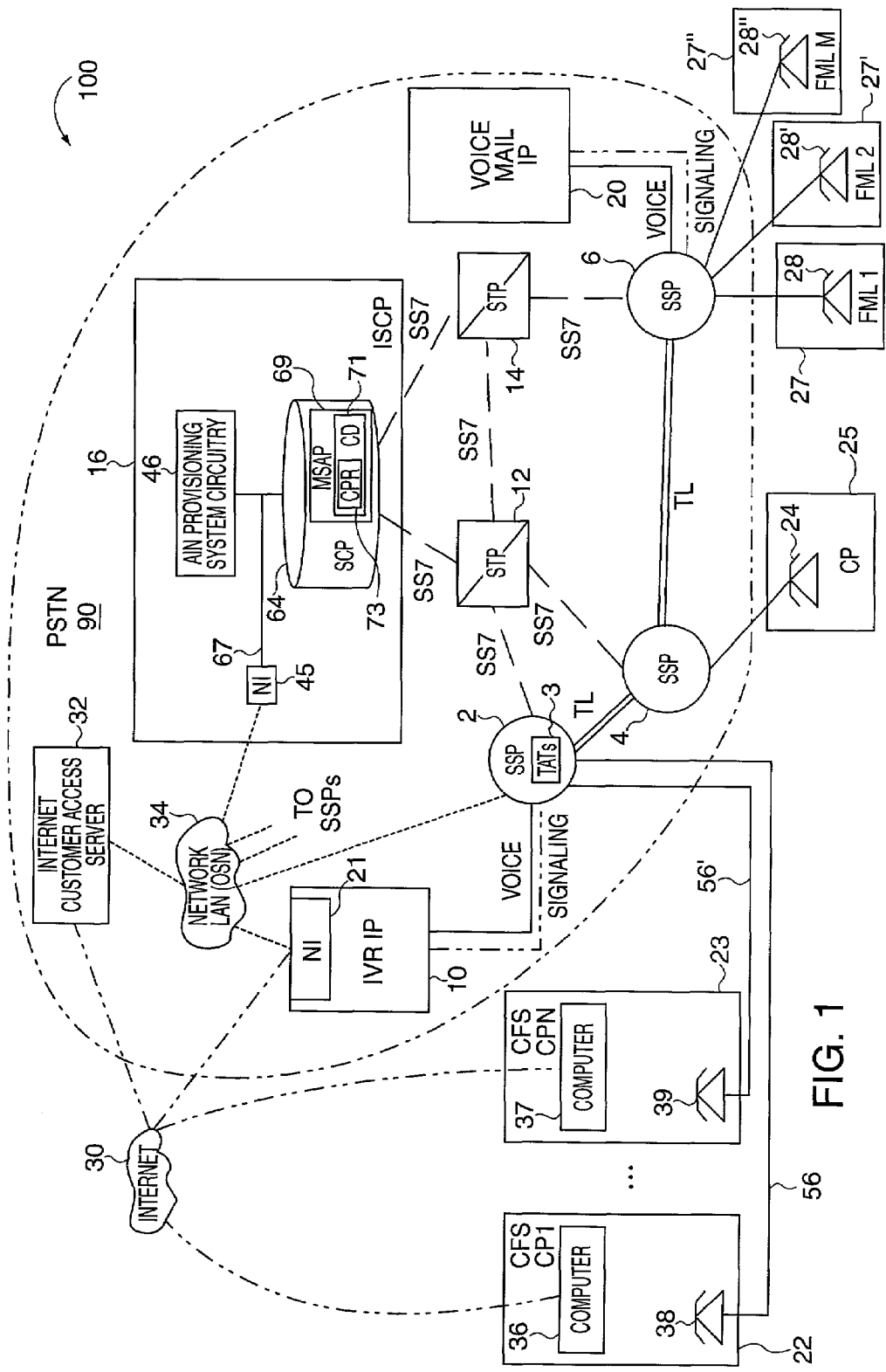
FIG. 1 illustrates a communications system implemented in accordance with an exemplary embodiment of the present invention.

FIG. 1 illustrates a communication system 100 implemented in accordance with an exemplary embodiment of the present invention. The system 100 supports communications via the Internet 30, as well as a public switched telephone network (PSTN) 90. The PSTN 90 includes a plurality of signal switching points (SSPs) 2, 4, 6, a plurality of signal transfer points (STPs) 12, 14, an integrated service control point (ISCP) 16, a Centrex Internet customer access server 32, an interactive voice response IP 10, and a local area network (LAN) 34.

The SSPs 2, 4, 6 may be implemented using known Class V telecommunications switches capable of supporting the Signaling System Seven (SS7) protocol. Each SSP 2, 4, 6 may correspond to a different telephone central office. Trunk lines (TL), which may be implemented using fiber optic cables, interconnect the various SSPs 2, 4, 6.

Each SSP 2, 4, 6 is normally connected to one or more customer premises (CPs) which may include, e.g., Centrex subscriber residences and/or offices as well as the residences and offices of non-Centrex subscribers. In the FIG. 1 example, first and second call forwarding service (CFS) customer premises 22 and 23 are coupled to the second SSP 2. An AIN terminating attempt trigger (TAT) 3 is set on each of the CFS telephone lines 56, 561 which couple the SSP 2 to the customer premises 22, 23. Additional customer premises 25, 27 include telephones 24, 28, respectively.

For purposes of explanation, customer premise 25 will be treated as a calling party location, i.e., a location from which a call originates, while customer premises 27, 27', 27" will be described as first, second and third call forwarding locations (CFLs), i.e., locations where an exemplary call forwarding service subscriber may be located and to which calls may be forwarded. Each of the customer premises may be identified by the telephone number assigned to the location. The designation of particular locations as calling party locations and call forwarding locations are for purposes of explaining the invention. It is to be understood that calls may be forwarded using any telephone number provided by a call forwarding service subscriber and that calls may originate from any telephone customer premises.

Connections between the SSPs and CPs may be by POTS lines, ISDN lines, DSL, or other known communications lines.

Communications equipment, referred to as customer premise equipment (CPE) is located at each customer premises. Customer premise equipment may include, e.g., telephones, faxes, computers, PBXs, etc. In FIG. 1, a computer 36, and land-line telephone 38 are shown as being located at the first customer premises 22. As will be discussed below, each of these devices corresponds in the exemplary embodiment shown in FIG. 1 to a first call forwarding service subscriber who may receive the call forwarding service of the present invention as part of a Centrex service package. The computer 36, located at the first customer premises 22 is coupled by any one of a plurality of known connection techniques, e.g., telephone dial-up, ISDN, DSL, etc., to the Internet 30, also known as the World Wide Web.

The computer 37 located at the Nth customer premises 23 is coupled to the Internet 30, e.g., in the same manner as computer 36.

While the additional customer premises 25, 27, 27', 27" are illustrated as including only landline phones, it is to be understood that they may have any number of communications devices including, e.g., telephone, fax, and computer devices. For purposes of explanation, it will be assumed that the first customer premises 22 corresponds to a first call forwarding service subscriber while the second customer premises 23 corresponds to a second call forwarding service subscriber. Additional call forwarding service subscribers may be coupled to any one of the SSPs 2, 4, 6.

The system 100 is implemented using AIN techniques. Accordingly, the processing of calls directed to a customer's telephone line and received by an SSP from a telephone customer's line may be controlled by instructions included in customer call processing records (CPRs). In the system 100, the CPRs are stored at the Integrated Services Control Point (ISCP) 16. At least one CPR exists for each call forwarding service subscriber. A customer's CPR is accessed in response to activation of an AIN trigger, e.g., TAT 3, set at, e.g., the SSP 2, 4, or 6 to which the telephone line or lines to the subscriber's customer premises are connected.

The ISCP 16 includes an SCP 64, an AIN provisioning system 46 and a network interface (NI) 45. A local network 67 couples the various components of the ISCP 16 together.

The network interface 45 couples the ISCP 16 to various other components of the telephone network 100 via a TCP/IP based network referred to as an operational services network (OSN) 34. The OSN 34 connects the Centrex Internet Customer Access Server 32, SSPs 2, 4, 6, Intelligent Peripherals (IPs) 10, 20, and the ISCP 16 together. Thus, the OSN 34 is a network over which control and signaling information can be passed between the various telephone network system components, e.g., using TCP/IP. Significantly, OSN 34 allows for interaction between the ISCP and IVR IP 10 used to provide call forwarding services in accordance with the invention.

In addition to being connected to the OSN 34, ISCP 16 is connected, via its SCP 64, to the SSPs via one or more signal transfer points (STPs) 12, 14 and Signaling System Seven (SS7) interconnects over which messages, data, and requests for call processing control instructions can be communicated between the SSPs 2, 4, 6, and ISCP 16.

The SCP 64 includes a multi-service application platform (MSAP) database 69 which includes customer data (CD) 71 for each of a plurality of call forwarding service subscribers and/or other service subscribers. The customer data 71 includes, for each customer: 1) a list of the services to which the customer subscribes; 2) a password which may be input via DTMF signals; and 3) a call processing record (CPR) 73 which is used to instruct an SSP how to process a call in response to an AIN trigger to thereby implement the services to which the customer subscribes. Additional customer and/or service information may also be included in customer data 71. Exemplary services which may be supported by the ISCP 16 include, e.g., call forwarding, call screening, voice dialing, voice mail and a host of other services which may be provided to Centrex subscribers as well as non-Centrex telephone service customers.

For purposes of explaining the call forwarding features of the present invention, the services will be described in the context of a Centrex environment. However, it is to be understood that the services of the present invention can be provided outside the Centrex environment, e.g., call forwarding service can be provided to non-Centrex telephone customers as well as Centrex service subscribers. In addition, many of the call forwarding methods and features of the present invention can be implemented in customer premise equipment, e.g., a PBX, instead of telephone equipment within the PSTN.

The customer data 71 which includes call processing records 73 is generated, at least initially, by the AIN provisioning system 46 in response to input received from a service representative or operator. Customer data in the database 71 may, after initial provisioning of a service for a customer, be updated by the customer via the Internet and the use of a Web browser by way of the Centrex ICAS server 32 which can access and modify the contents of the customer data 71.

Among other things, the AIN provisioning system circuitry 46 is responsible for setting terminating attempt triggers, at the various signal switching points (SSPs) required to implement AIN based services to the subscribers. In addition to setting AIN triggers, the AIN provisioning system circuitry 46 is responsible for generating and/or updating customer data, e.g., call processing records 73, and other information stored in various locations in the system 100, as required to implement a service order. IPs 10, 20 are used to provide services to Centrex and other telephone service subscribers. Thus, in addition to updating information in the customer database 71, the AIN provisioning system circuitry 46 is responsible for updating information in the various IPs 10 and 20. The updating of the IPs and the setting of AIN triggers can be performed by the AIN provisioning system circuitry 46 through communications with the various system components conducted using the OSN 34 and/or via SS7 links to the ISCP 16. As will be discussed below, much of the customer data 71 relating to call forwarding is loaded into the IVR IP 10, e.g., by way of OSN 34.

The ICAS 32 serves as a secure gateway via which call forwarding service subscribers can update and configure their telephone service information, including e.g., Centrex information, using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or IP 10 coupled to the OSN 34.

In order to implement various services, such as voice dialing and telephone access to customer service information, IP 10 is used. IP 10 is an interactive voice response (IVR) IP which is capable of performing speech recognition and DTMF signal detection operations, as well as playing voice prompts and other messages to customers.

IVR IP 10 is coupled to the first SSP 2 via audio (voice) and signaling lines. It is also coupled to the OSN 34 and the Internet 30 through a network interface (NI) 21. In this manner, the IVR IP 10 can interact with other components of the system 100, e.g., ISCP 16, via communications transmitted over OSN 34 or through the SSP 2. The IVR IP 10 may be implemented using known hardware. Accordingly, the hardware used to implement IVR IP 10 will not be described in detail.

The IVR IP 10 serves as a platform by which a call forwarding service subscriber can update his/her service information, e.g., call forwarding information, through a telephone as opposed to an Internet connection. A service subscriber can establish a service updating or management session with the IVR IP 10, by dialing a telephone number associated with the IVR IP 10. Dialing of the IVR IP's telephone number results in the subscriber's call being routed to SSP 2 and a voice/DTMF connection to the IVR IP 10 being established.

IVR 10 includes various security features, e.g., customer identification and password entry requirements, as does the ICAS 32, to insure that Centrex customers are limited to accessing and updating their own service records and not those of other Centrex service subscribers. Modifications to call forwarding information made via IVR IP 10 are communicated to the ISCP 16 so that customer data 71 stored in both locations remains consistent.

Voice mail IP 20, coupled to SSP 6, can be used to provide voice mail services to call forwarding as well as non-call forwarding service subscribers.

Figure 2:
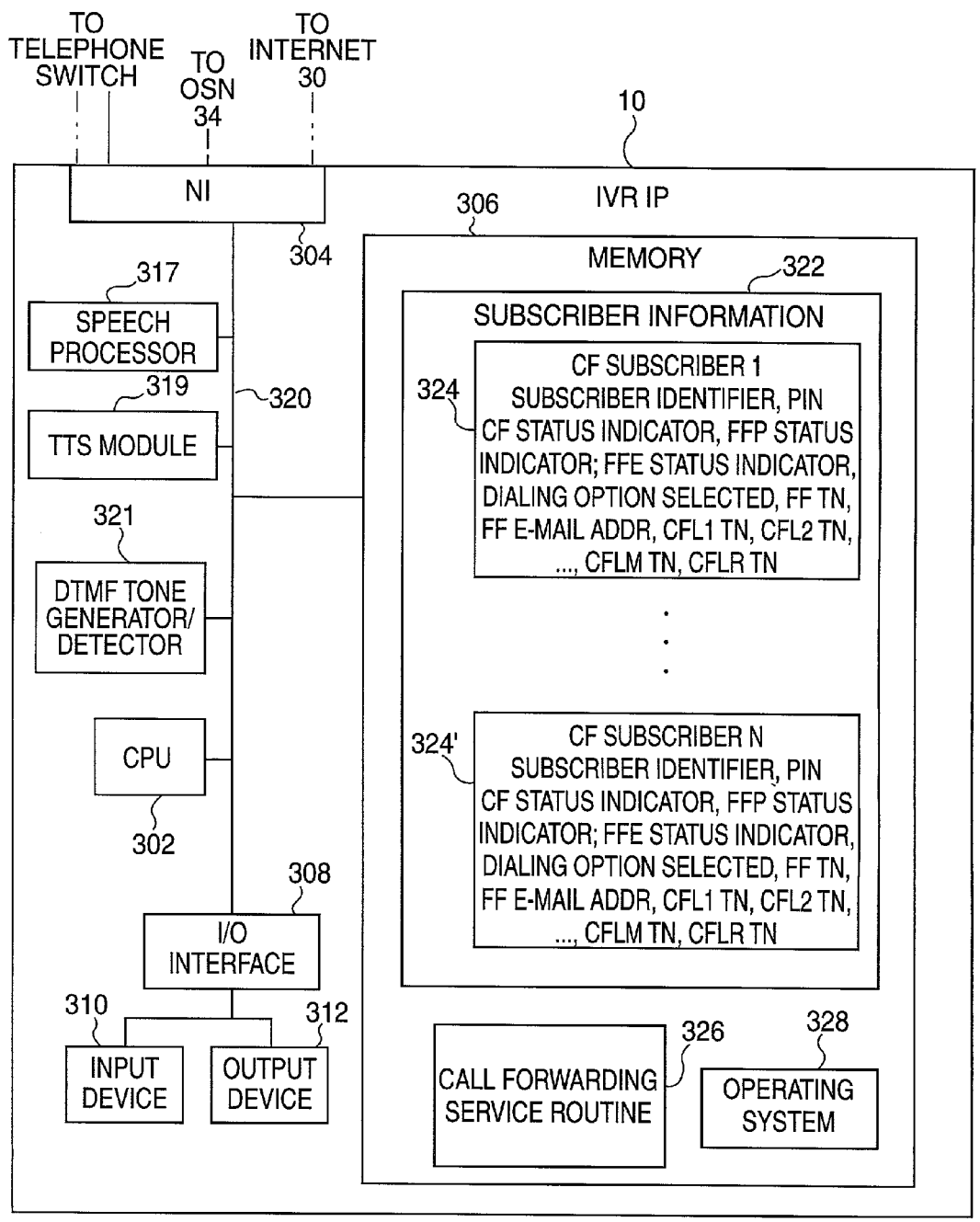
FIG. 2 illustrates an interactive voice response intelligent peripheral device capable of performing voice and fax call forwarding functions in accordance with the present invention.

FIG. 2 illustrates an exemplary IVR IP 10. The IVR IP 10 includes network interface 304, a speech processor 317, a text to speech (TTS) module 319, DTMF tone generator/detector 321, central processing unit (CPU) 302, an input/output (I/O) interface 308, and memory 306, which are coupled together by bus 320. The speech processor 317 can be used to perform speech recognition operations. DTMF tone generator/detector 321 supports the detection of DTMF signals from subscribers and allows the IP 10 to generate DTMF tones use to place calls through a telephone switch, e.g., SSP 2. The TTS module 319 allows the IP 10 to play messages to calling parties, subscribers and to individuals answering calls initiated by the IP 10. I/O interface 308 is coupled to an input device 310, e.g., keyboard, and an output device 312, e.g., display. Using input and output devices 310, 312 a local system administrator can access the IP 10, e.g., for system maintenance. Network interface 304 couples the IP 10 to the telephone switch, e.g., SSP 2, to the OSN 34 and to the Internet 30 allowing the server 35 to receive and send messages to and from devices coupled to the OSN 34 and Internet 30. The connection to ISCP 64 via OSN 34 allows subscriber information as well as other information to be retrieved from and loaded into the IP 10, e.g., by the ICAS 32 or SCP 64 via the network interface 304. Network interface 304 also couples the IP 10 to SSP 2 by voice and signaling lines allowing the IP 10 to receive and initiate voice calls via SSP 2.

The memory 306 includes a set of subscriber information 322, a call forwarding service routine 326 and an operating system 328. The set 322 of subscriber information includes, for each of a first through Nth service subscriber, a record of subscriber information 324, 324' which is the same as or similar to the customer data 71 stored in the ISCP with the exception of a CPR. Each subscriber record 324, 324' includes a subscriber identifier, e.g., the subscriber's telephone number, a PIN when required by the subscriber to receive a forwarded call, a call forwarding (CF) status indicator, a fax forwarding by phone (FFP) status indicator, a fax forwarding by E-mail (FFE) status indicator, call forwarding dialing option selection information (sequential, parallel, sequential/parallel), a fax forwarding telephone number (FF TN) if faxes are to be forwarded by phone, a fax forwarding (FF) E-mail address if faxes are to be forwarded by E-mail, a list of call forwarding (CF) telephone numbers and a call forwarding last resort (CFLR) telephone number. The CFLR telephone number is the telephone number to be used when a response is not received from any of the CF telephone numbers. Each status indicator indicates whether the corresponding service is active, i.e., enabled, or inactive, e.g., disabled.

The CPU 302 controls operation of the IP 10 under control of an operating system 328 and call forwarding service routine 326 stored in memory 306. Routine 326 includes a plurality of computer instructions for controlling various telephone service operations. Under control of the routine 326 the CPU 302 controls the IP 10 to interact with various other system components including SSP 2 and ISCP 16. Operations performed by the IP will be discussed further in regard to the flow charts of FIGS. 4–6.

Figure 3:
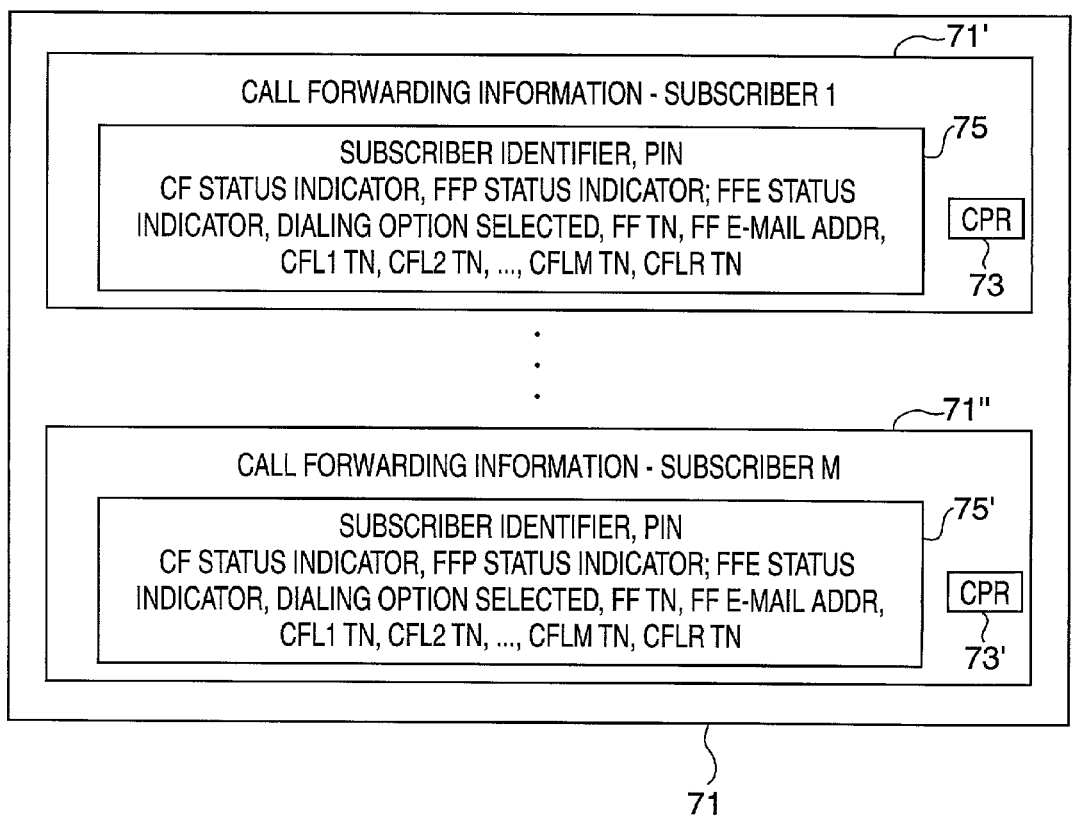
FIG. 3 illustrates a set of exemplary call forwarding information which may be stored as part of a customer record.

FIG. 3 illustrates a set 71 of exemplary customer data. A record of call forwarding service data 71' is maintained in the set 71 for each call forwarding service subscriber. Each record 71' includes service data 75 and a call processing record 73. The call processing record 73 includes instructions used by the SCP 64 to determine how to handle a call directed to the subscriber's line. Service data 75 may be included as part of the CPR 73 but is shown separately for purposes of explanation. Service data 75 includes information previously discussed with regard to subscriber information 324, 324'. Accordingly, this information will not be discussed again in detail. In addition to call forwarding service information service data 75 may include addition information relating to other AIN, e.g., Centrex, service which are supplied to a telephone service subscriber.

Figure 4:
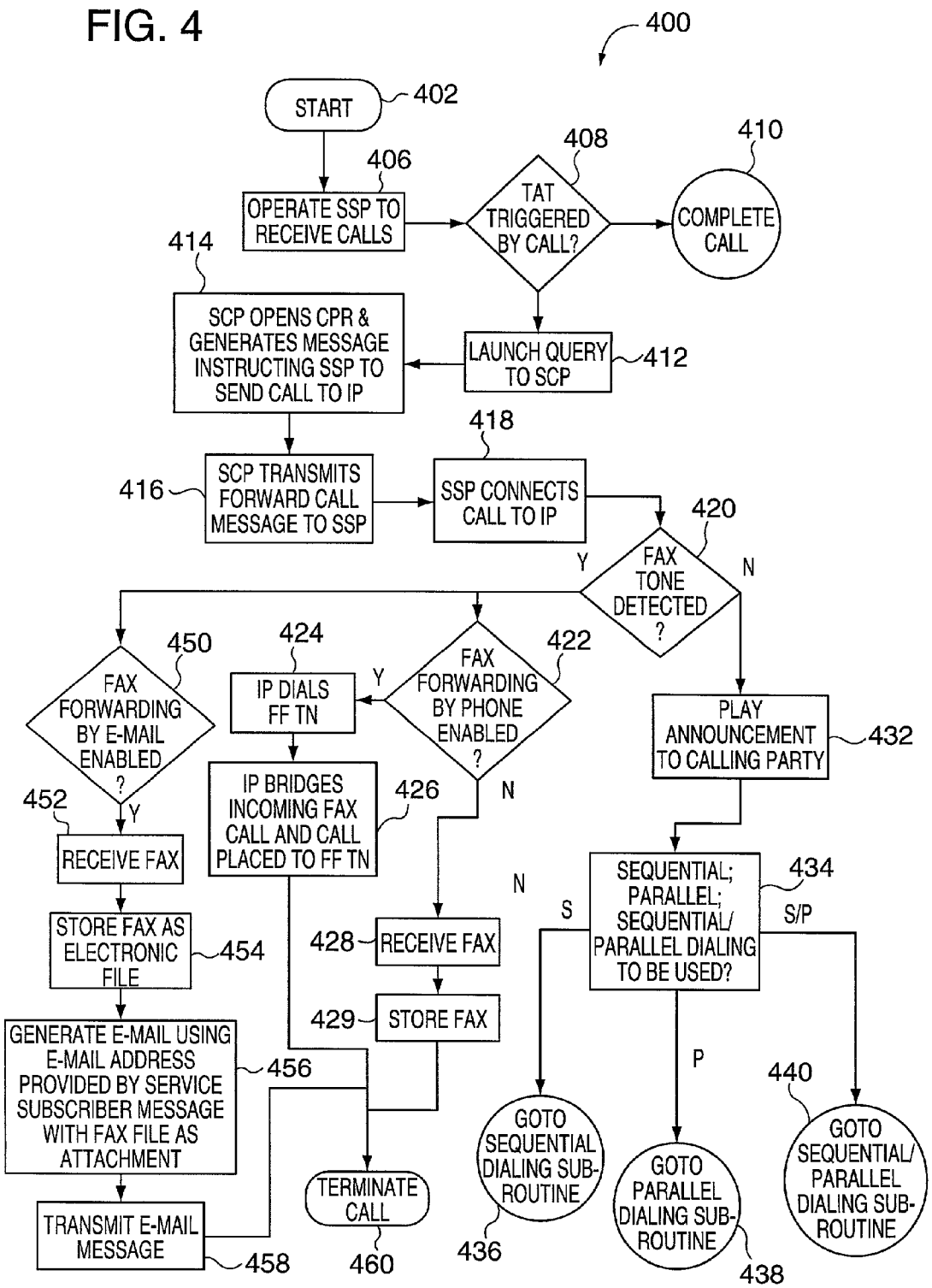
FIG. 4 is a flow chart illustrating call processing performed as part of a call forwarding operation.

FIG. 4 is a flow chart 400 illustrating the steps of a call forwarding method implemented in accordance with the present invention. The method begins in step 402 with the call forwarding subscriber information already stored in the SCP 64 and IP 10 and a TAT set on at least one call forwarding service subscriber's line at SSP 2, e.g., because the subscriber has call forwarding enabled. From start step 402 operation proceeds to step 406 wherein the SSP 2 is operated to receive calls. Step 408 reflects a divergence in call processing at the SSP 2 in regard to calls which activate TATs and calls which do not. If a call does not activate a TAT at the SSP 2, call processing proceeds from step 406 to step 410 via step 408. In step 410 the received call is completed in the normal fashion, e.g., it is completed to the called party number.

However, if a TAT is triggered on a call forwarding service subscriber's telephone line, e.g., because the subscriber has enabled call forwarding, call processing proceeds from step 406, via step 408, to step 412. In step 412, the SSP 2 temporarily halts call processing in response to activation of a TAT and sends a message to the SCP 64 requesting call processing instructions.

In response to the message from the SSP 2, in step 414, the SCP 64 opens the CPR 73 corresponding to the subscriber who's line was called and then, using information in the accessed CPR 73, generates a message instructing the SSP 2 to send the call to the IP 10 being used to provide the call forwarding service. Next, in step 416, the SCP 64 transmits the generated message to the SSP 2. In response to the message from the SCP 64, in step 418, the SSP 2 forwards the received call to the IP 10. In step 420, the incoming call is answered by the IP 10 and monitored for a fax tone. If in step 420 a fax tone is detected, operation proceeds to steps 422 and 450. Step 422 represents the start of a fax forwarding by phone processing branch while step 450 represents the start of a fax forwarding by E-mail processing branch. Both branches can operate in parallel providing a call forwarding service subscriber the opportunity to have faxes forwarded by telephone, E-mail, or both.

In step 422 a determination is made as to whether or not the called subscriber has fax forwarding by phone enabled. The IP 10 does this by checking the FFP status indicator in the called subscriber's information 324. In accessing subscriber information 324, the telephone number of the called party may be used to identify the correct subscriber record 324, 324'. If fax forwarding by phone is on, in step 424 the IP 10 initiates a call using the subscriber's FF TN via SSP 2. Then, in step 426 the IP 10 bridges the incoming fax call and the call placed to the FF TN. In this manner, the incoming call is forwarded to the fax forwarding number when fax forwarding is on. Operation proceeds from step 426 to step 430 wherein the incoming call is terminated in the usual manner, e.g., in response to the calling party hanging up.

If in step 422 it was determined that the called subscriber did not have fax forwarding by phone enabled, operation would proceed to step 428. In step 428, the IP answers the incoming fax call and receives the fax. Then in step 429 the IP 10 store the fax in memory, e.g., in fax store 329. In one embodiment, when call forwarding is deactivated as indicated by a change in the value of the subscriber's CF status indicator, the IP 10 automatically delivers the subscriber's stored faxes by calling the subscriber's telephone number and transmitting the stored fax messages. The faxes would then be received, printed and/or stored by the subscriber's fax machine as usual. After a fax is stored in step 428, operation proceeds to step 430 wherein the call is terminated in the normal manner.

In step 450, which represents the start of the fax forwarding by E-mail processing branch, a determination is made as to whether or not fax forwarding by E-mail is enabled. This is done by the IP 10 checking the called subscriber's FFE status indicator. If fax forwarding by E-mail is not enabled, processing along the branch starting with step 450 is halted. However, if fax forwarding by E-mail is enabled, operation proceeds from step 450 to step 452.

In step 452, the IP 10 receives the fax and then in step 454 the fax is stored as an electronic file, e.g., a TIFF image file. Next, in step 456, the IP 10 generates an E-mail message addressed using the fax forwarding (FF) E-mail address obtained from the called subscriber's information 324. The received fax is included in the E-mail message as an electronic file attachment. Once the E-mail message including the received fax is generated, in step 458 it is transmitted via E-mail, e.g., over the Internet 30, to the E-mail address specified by the called subscriber. With the fax message forwarded by E-mail, operation proceeds to call termination step 460.

In the above described manner, a call forwarding service subscriber can receive faxes by E-mail when traveling, e.g., by simply using a notebook computer to check for E-mail messages. Since the fax forwarding by E-mail can be performed in parallel to the fax forwarding by phone, the call forwarding service subscriber can receive an E-mail copy of a fax while the fax is still transmitted to a facsimile machine where it will be printed. In fact, in cases where a FF forwarding number is not specified, the faxes will be stored and transmitted to the subscriber's own fax machine when call forwarding is deactivated.

If in step 420 a fax tone is not detected by the IP 10, operation proceeds directly to step 432 wherein the IP 10 plays an announcement to the calling party, e.g., requesting that the calling party wait while an attempt is made to locate the called party. From step 432, operation proceeds to step 434 wherein the IP determines from the subscriber information whether the subscriber has selected sequential, parallel or sequential/parallel dialing to be used for the forwarding of voice calls.

Figure 5:
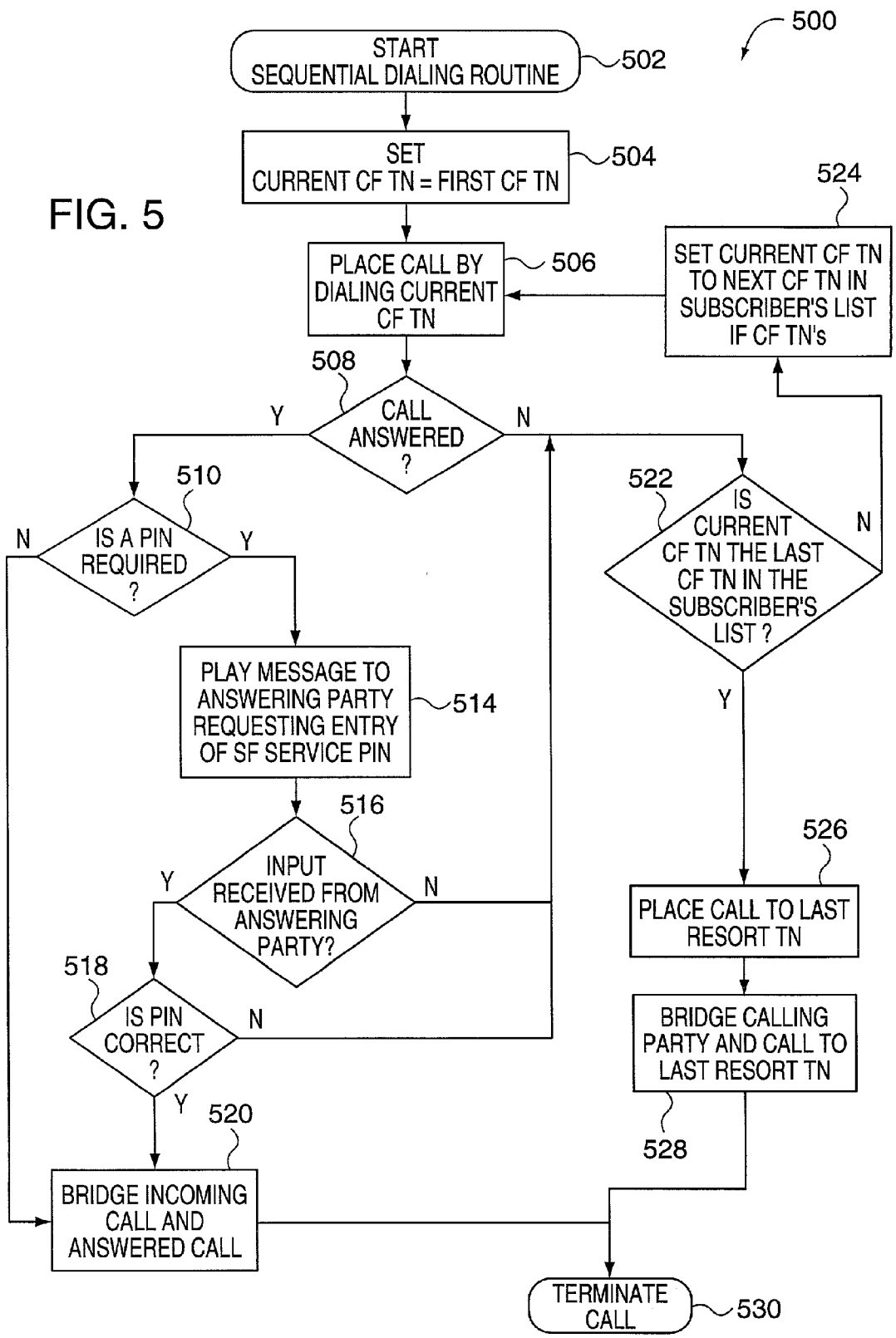
FIG. 5 illustrates an exemplary sequential dialing routine.

If the subscriber selected sequential dialing, operation proceeds from step 434 to the start step 502 of the sequential dialing sub-routine 500, illustrated in FIG. 5, via GOTO step 436. However, if the subscriber selected parallel dialing, operation proceeds from step 434 to the start step 602 of the parallel dialing routine 600, illustrated in FIG. 6, via GOTO step 436. However, if the subscriber selected sequential/parallel dialing, operation proceeds from step 434 to the start step 702 of the sequential/parallel dialing routine 700, illustrated in FIG. 7, via GOTO step 436.

The sequential dialing sub-routine 500 supports the sequential calling of a plurality of locations in an attempt to reach a call forwarding subscriber. The sub-routine 500 includes support for the use of PINs to prevent calls being connected to the wrong party, and the use of a last resort number, e.g., corresponding to an answering machine or answering service, for servicing calls when the call forwarding subscriber can not be reached.

Figure 6:
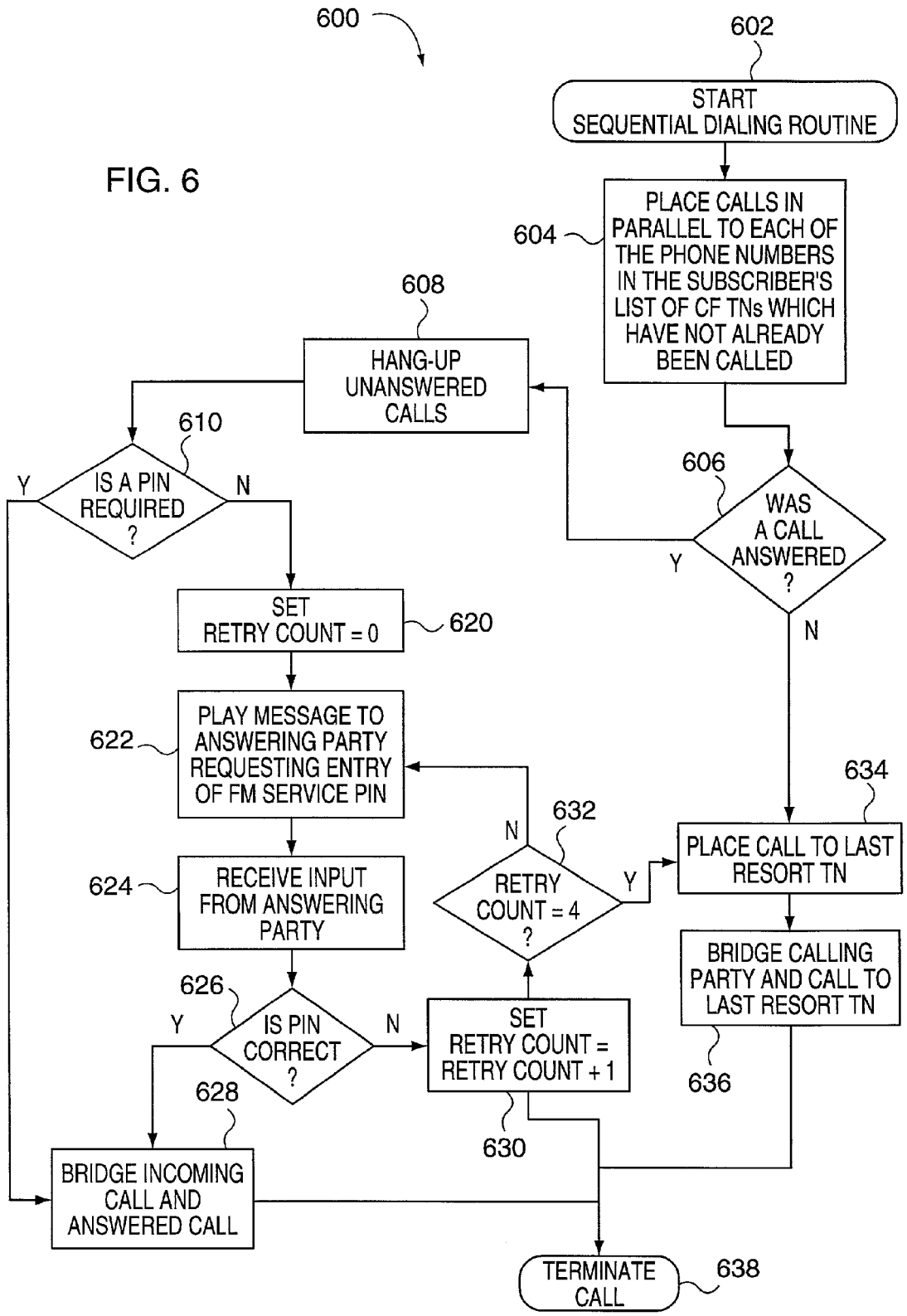
FIG. 6 illustrates an exemplary parallel dialing routine.
Figure 7:
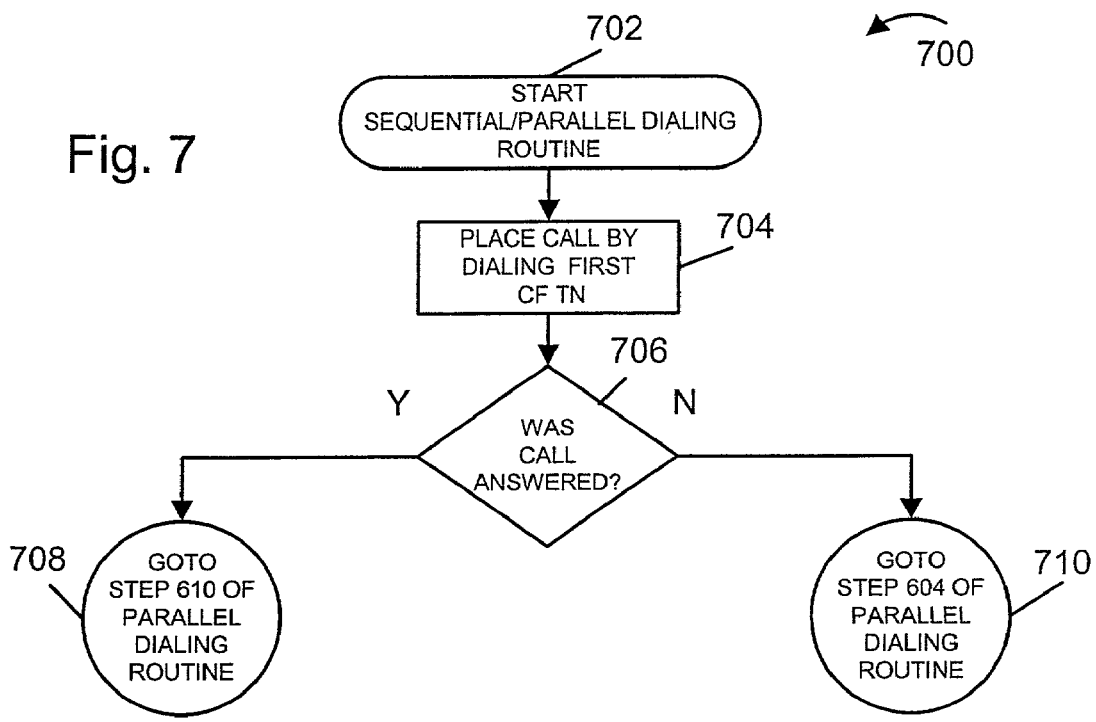
FIG. 7 illustrates an exemplary sequential/parallel dialing routine.

The sequential dialing sub-routine 500, like sub-routines 600 and 700 illustrated in FIGS. 6 and 7, may be implemented in software as part of the IP's call forwarding service routine 326. The sub-routines 500, 600, 700 may be executed by the CPU 302 as needed.

The sequential dialing sub-routine 500 starts in step 502 when it is executed by the IP's CPU to service a call directed to a call forwarding service subscriber. From step 502 operation proceeds to step 504 wherein a current call forwarding telephone number, i.e., current CF TN, is step equal to the first CF TN in the called subscriber's list of call forwarding telephone numbers (CFL1 TN, . . . CFLM TN) obtained from subscriber information 324. Then in step 506 the IP 10 initiates a call by dialing the current CF TN which, in this first iteration through step 506, will be the first CF TN in the subscriber's list. Next, in step 508 the IP 10 determines if the call was answered.

If the call placed in step 506 was answered, operation proceeds to step 510 wherein a determination is made as to whether a personal identification number (PIN) is required from the person answering the call. This may be done by checking to see if the call forwarding service subscriber stored an optional PIN in his/her set of subscriber information 324.

If a PIN is not required, operation proceeds from step 510 to step 520 wherein the incoming call and the answered call are bridged thereby forwarding the incoming call to a location in the subscriber's CF TN list.

However, if in step 510 it is determined that a PIN is required from the answering party before the incoming call is bridged with the answered call, operation proceeds from step 510 to step 514. In step 514, the IP plays the answering party a message requesting that the answering party enter the called subscriber's call forwarding PIN. After a preselected period of time, e.g., several seconds, in step 516 a determination is made as to whether input was received from the answering party. If input was not received in the preselected period of time, operation proceeds to step 522. However, if input is received, operation proceeds from step 516 to step 518.

In step 518 a determination is made as to whether the answering party entered the correct PIN. This may be done by comparing the received input from the answering party to a PIN obtained from the called subscriber's information 324. If in step 518 it is determined that the received information does not match the call forwarding service subscriber's PIN, operation proceeds to step 522.

However, if in step 518 the entered PIN is determined to be correct, operation proceeds to step 520 wherein the incoming call and the answered call are bridged. Operation proceeds from step 520 to step 530 wherein the call is terminated in the usual manner, e.g., in response to the calling or answering party hanging up.

In step 522 a determination is made as to whether the current CF TN is the last CF TN in the subscriber list of CF TNs. That is, a check is made to see if there are any more CF TNs to try before using the subscriber's call forwarding last resort telephone number, LR TN. If the current CFLR TN is not the last CF TN in the subscriber's list of CF TNs, operation proceeds to step 524 wherein the current CF TN is set to the next CFTN in the subscriber's list of CF TNs. Operation proceeds from step 524 to step 506 wherein the IP 10 initiates a call using the current CF TN which was just updated.

If, in step 522 it was determined that the current CF TN is the last CF TN in the subscriber's list of CF TNs, then operation proceeds to step 526. In step 526 the IP 10 places a call using the subscriber's CFLR TN. Then, in step 528, the incoming call is bridged to the call directed to the CFLR TN. Following bridging of the call, operation proceeds to step 530 wherein the call is allowed to terminate in the normal manner. Thus, if an answer is not received from any of the called locations, the caller can still be connected to an answering machine or answering service.

In the sub-routine illustrated in FIG. 5, the answering party is provided a single opportunity to enter the correct PIN. The sub-routine 500 can, and in various implementations is, modified to provide an answering party multiple, e.g., 3, opportunities to correctly enter the required PIN before the next number in the subscriber's list of CF TNs is tried.

FIG. 6 illustrates a parallel dialing sub-routine 600 that may be implemented by the IP 10. The sub-routine 600 starts in step 602 when executed by the IP's processor 302. Then, in step 604, the IP 10 places calls to each of the telephone numbers in the subscriber's list of CF TNs in parallel. Thus, if the list of CF TNs includes M telephone numbers, M calls would be placed in parallel in step 604. Once the calls to the CF locations are initiated, in step 606 the IP monitors to detect the answering of a call. If none of the calls are answered after a preselected period of time, e.g., 60 seconds, operation proceeds to step 634.

However, if a call is answered, operation proceeds from step 606 to step 608, in response to the IP 10 detecting that one of the calls was answered. In step 608 the calls to the subscribers CF TNs, with the exception of the one that was answered, are terminated. Thus, the first call forwarding location to respond is the one that will be considered for forwarding the call.

Operation proceeds from step 608 to step 610. In step 610 a determination is made as to whether entry of a PIN by the answering party is required before an incoming call will be forwarded to the answering location. If a PIN is not required, e.g., as indicated by the absence of an optional PIN in the subscriber's call forwarding data, operation proceeds directly to step 628 wherein the incoming call and answered call are bridged.

However, if in step 610 it is determined that entry of a PIN is required, operation proceeds from step 610 to step 620. In step 620 a retry counter, retry count, is initialized to zero. Then, in step 622 the IP 10 plays a message to the answering party requesting entry of a call forwarding PIN. In step 624 input is received from the answering party. For purposes of step 624 a preselected period of silence may be treated as input from the answering party. In step 626 the received input is compared to the call forwarding subscriber's PIN. If in step 626 it is determined that the received input matches the subscriber's PIN, operation proceeds to step 628.

As discussed above, in step 628, the incoming call and answered call are bridged completing the incoming call to answering call forwarding location. Operation proceeds from step 628 to step 638 wherein the bridged call is terminated in the normal manner, e.g., in response to one of the parties hanging up.

If in step 626 it is determined that the received input did not match the subscriber's PIN, operation proceeds to step 630 wherein the retry count is incremented by one. The in step 632 the retry count is compared to the value 4. If RETRY COUNT=4, indicating that the answering party already had three chances to enter the correct PIN, operation proceeds to step 634, otherwise operation proceeds once again to step 622 wherein the answering party is requested to enter the required PIN.

In step 634, the IP 10 places a call to the call forward last resort telephone number, CFLR TN. Then, in step 636, the incoming call and the call to the CFLR TN are bridged. Following the call bridging procedure, operation proceeds to step 638 wherein the incoming call is terminated in the normal manner, e.g., when the calling party hangs up.

FIG. 7 illustrates a sequential/parallel dialing sub-routine 700 which may be executed by the IP 10. The sub-routine starts in step 702 with the execution of the sub-routine by the IP's CPU 302. Then, in step 704, the IP 10 places a call to the first CF TN in the subscriber's list of CF TNs. Next, in step 706 a determination is made as to whether the call to the first CF TN was answered within a preselected period of time. If the call to the first TN was answered, operation proceeds to step 610 of the parallel dialing sub-routine via GOTO step 708, e.g., to determine if entry of a PIN is required before the incoming call is to be connected to the answering party and for additional call processing. However, if in step 706 it is determined that the call to the first CF TN was not answered in a preselected period of time, operation proceeds to step 604 of the parallel dialing routine 600 via step 710. This will result in the remaining telephone number's in the subscriber's CF TN list to be dialed in parallel.

While the sequential/parallel dialing routine 700 makes a call to a single CF TN before initiating a parallel dialing operation, sequential calls to any desired number of CF TNs may be performed prior to resorting to parallel dialing of the remaining CF TNs.

Numerous variations on the above described methods and apparatus are possible without departing from the scope of the invention.

What is claimed is:

1. A communications method, comprising the steps of:
providing a service subscriber an opportunity to separately enable and disable forwarding of fax and voice telephone calls directed to a first telephone number corresponding to the service subscriber;
detecting a first telephone call to the first telephone number corresponding to the service subscriber;
determining if the first telephone call is a fax or voice telephone call;
and if the first telephone call is determined to be a fax telephone call, and fax forwarding has been enabled by said subscriber, performing, i) a fax delivery by E-mail operation and ii) a fax delivery by telephone operation when a customer record corresponding to said subscriber includes information indicating that a received fax directed to said subscriber is to be forwarded by both telephone and E-mail thereby resulting in delivery of a facsimile received from said first telephone call by both an E-mail message and by a telephone call thereby providing delivery of the facsimile to multiple devices.

2. The method of claim 1, wherein performing a fax delivery by E-mail operation includes the steps of:
receiving a facsimile message transmitted via the first telephone call;
storing the received facsimile message as an electronic file; and
E-mailing the electronic file to a call forwarding service subscriber.

3. The method of claim 1,
wherein determining if the first telephone call is a fax or voice telephone call includes: monitoring the answered call for a tone indicative of a fax communication;
wherein if the first telephone call is determined to be a voice telephone call, the method further comprises forwarding the first telephone call using a second telephone number; and
wherein performing a fax delivery by phone operation includes using a third telephone number, the third telephone number being different from said second telephone number.

4. The method of claim 3, further comprising:
retrieving from stored call forwarding service subscriber information at least one of a stored voice call forwarding telephone number and a stored fax forwarding telephone number, the stored voice call forwarding telephone number being used as said second telephone number, the stored fax forwarding telephone number being used as said third telephone number.

5. The method of claim 4, wherein said step of forwarding the first telephone call using a second telephone number includes:
placing a telephone call to said second telephone number; and
bridging the first telephone call and the telephone call to the second telephone number.

6. The method of claim 5,
wherein detecting a first telephone call includes setting a terminating attempt trigger at a telephone switch on a telephone line corresponding to the first telephone number; and
wherein placing a telephone call to said second telephone number and bridging the first telephone call and the telephone call to the second telephone number are performed by a peripheral device coupled to said telephone switch.

7. The communications method of claim 4, further comprising:
retrieving from stored call forwarding service subscriber information at least one of a stored voice call forwarding telephone number and a stored fax forwarding telephone number, the stored voice call forwarding telephone number being used as said second telephone number when retrieved, the stored fax forwarding telephone number being used as said third telephone number when retrieved; and retrieving from said stored call forwarding service subscriber information an E-mail address to be used when forwarding a fax by E-mail.

8. A communications method for use in a telephone network including a telephone switch, service control point, and telephone switch peripheral device, comprising the steps of:
setting a terminating attempt trigger at a telephone switch on a telephone line corresponding to a first telephone number;
in response to activation of said terminating attempt trigger by a first telephone call, operating the telephone switch to contact a service control point for call processing instructions;
operating said service control point to instruct the telephone switch to connect the first telephone call to the telephone switch peripheral device;
operating the telephone switch peripheral device to answer the first telephone call and to then determine if the first telephone call is a fax or voice telephone call;
if the first telephone call is determined to be a fax telephone call,
generating a file including a fax communicated by said first telephone call;
delivering said file including a fax via E-mail;
operating the telephone switch peripheral device to retrieve a fax telephone call forwarding telephone number from a set of stored subscriber information; and
forwarding the first telephone call using the retrieved fax telephone call forwarding telephone number to thereby deliver said fax to a subscriber device via a call in addition to delivery via E-mail.

9. The method of claim 8, wherein the first telephone number is a telephone number corresponding to the party to whom the call is directed, wherein if the first telephone call is determined to be a voice telephone call and voice call forwarding is enabled by the party to whom the call is directed, the method further comprises:
i. operating the telephone switch peripheral device to retrieve a voice telephone call forwarding telephone number from the set of stored subscriber information, said voice telephone call forwarding telephone number being different from said first telephone number; and
ii. forwarding the first telephone call using the retrieved voice telephone call forwarding telephone number, forwarding the first telephone call using the retrieved voice telephone call forwarding telephone number includes operating the telephone switch peripheral device to:
place a call to said call forwarding telephone number; and
bridge the first telephone call and the call to said call forwarding telephone number.

10. The method of claim 9, wherein forwarding the first telephone call using the retrieved fax telephone call forwarding telephone number includes operating the telephone switch peripheral device to:
place a call to said fax telephone call forwarding telephone number; and
bridge the first telephone call and the call to said fax telephone call forwarding telephone number.

11. The method of claim 8, further comprising, prior to operating the telephone switch peripheral device to determine if the first telephone call is a fax or voice telephone call:

storing said set of subscriber information including a voice telephone call forwarding telephone number and a fax telephone call forwarding telephone number in said telephone switch peripheral device.

12. The method of claim 11, further comprising, storing in said set of subscriber information an E-mail address to be used for forwarding a fax by E-mail.

13. The method of claim 12, further comprising:
monitoring the forwarded call, between the first telephone call and the call to said fax telephone call forwarding telephone number, for fax data corresponding to the fax message.

14. A communications method, the method comprising the steps of:
operating a telephone switch to detect a call to a telephone number corresponding to a call forwarding service subscriber;
connecting the telephone call to a peripheral device coupled to the telephone switch;
operating said peripheral device to:
i. answer said call;
ii. determine if the answered call is a fax telephone call or a non-fax call;
iii. if it is determined that the answered telephone call is a fax telephone call, connect the call by a telephone line to a facsimile device corresponding to the call forwarding service subscriber while monitoring the telephone call to receive a facsimile message delivered to the facsimile device; and
iv. send an E-mail message including said received facsimile message to thereby deliver said facsimile by an E-mail device corresponding to said subscriber in addition to delivery to said facsimile device corresponding to said subscriber.

15. The communications method of claim 14, further comprising the step of:
using the called telephone number to access a call forwarding service subscriber record; and
retrieving from the call forwarding service subscriber record an E-mail address to be used for forwarding a fax message.

16. The communications method of claim 15, wherein the step of operating a telephone switch to detect a call to a telephone number includes:
setting a terminating attempt trigger on a telephone line corresponding to said telephone number; and
wherein the method further comprises:
if it is determined that the answered call is a non-fax call, forwarding the call to another telephone number.

17. The communications method of claim 16, further comprising the step of:
contacting a service control point for call processing instructions in response to activation of said terminating attempt trigger; and
wherein connecting the telephone call to a peripheral device includes:
operating the telephone switch to couple the detected call to the peripheral device in response to an instruction received from the service control point.

18. The communications method of claim 17,
wherein the instruction received form the service control point is a STOR message; and
wherein the peripheral device is coupled to said telephone switch by an additional telephone switch.

19. A fax forwarding method, the method comprising:
for each of a plurality of fax forwarding service subscribers, creating a subscriber record including:

at least one telephone number corresponding to a telephone line on which the forwarding service subscriber may receive a fax call;
fax forwarding by E-mail status information indicating whether faxes are to be forwarded by E-mail;
fax forwarding by telephone status information indicating if faxes are to be forwarded by telephone; and
an E-mail address to be used to forward a fax received by answering a call directed to said at least one telephone number;
monitoring a plurality of said telephone lines on which fax forwarding service subscribers may receive fax calls; and
in response to receiving a call on one of said monitored lines:
determining if said received call is a fax call or a non-fax call;
if the received call is determined to be a fax call and the fax forwarding by E-mail status information indicates faxes are to be forwarded by E-mail for the monitored line on which the call was received, determining from the subscriber record corresponding to the telephone line on which the fax call is received, an E-mail address to be used for forwarding a fax received on said telephone line; and forwarding by E-mail, using the determined E-mail address, a fax received on said telephone line; and
if the call is determined to be a fax call and the fax forwarding by telephone status information indicates faxes are to be forwarded by telephone for the monitored line on which the call was received, forwarding said fax call to a telephone number indicated by the subscriber record corresponding to the telephone line on which the call was received.

20. The method of claim 19, wherein monitoring a plurality of said telephone lines on which fax forwarding service subscribers may receive fax calls includes:
setting an AIN terminating attempt trigger on each of said plurality of telephone lines.

21. The method of claim 19, further comprising, in response to receiving a fax call on one of said monitored lines, performing the additional steps of:
determining, by accessing the subscriber record corresponding to the telephone line on which the fax call is received, a fax forwarding telephone number to be used for forwarding a fax received on said telephone line; and
placing a call using the determined fax forwarding telephone number; and
bridging the placed call and the received fax call thereby forwarding the fax call by telephone.

22. The method claim 1, further comprising:
if the first telephone call is determined to be a fax telephone call, prior to performing, in parallel, i) a fax delivery by E-mail operation and ii) a fax delivery by telephone operation:
determining if forwarding information corresponding to said first telephone number includes a fax forwarding by telephone status indicator indicating that fax forwarding by telephone is to be performed and if said forwarding information also includes a fax forwarding by E-mail status indicator indicating that fax forwarding by E-mail is to be performed, said step of performing, in parallel, i) a fax delivery by E-mail operation and ii) a fax delivery by telephone operation being performed only when both said fax forwarding by telephone and fax forwarding by E-mail indicators indicate that fax forwarding is to be performed.

23. The method of claim 1, further comprising:
if the first telephone call is determined to be a fax telephone call, and voice call forwarding has been enabled by said subscriber but fax forwarding has not been enabled by said subscriber, performing the steps of:
storing faxes received while said voice call forwarding is enabled and fax forwarding is not enabled.

24. The method of claim 23, further comprising:
automatically transmitting the stored faxes to the first telephone number when voice call forwarding is deactived.

25. The method of claim 1, wherein providing a service subscriber an opportunity to separately enable and disable forwarding of fax and voice telephone calls directed to a first telephone number corresponding to the service subscriber includes:
providing a service coupled to the Internet by which a service subscriber can update call forwarding information included in said customer record.

26. The method of claim 25, wherein providing a service subscriber an opportunity to separately enable and disable forwarding of fax and voice telephone calls directed to a first telephone number corresponding to the service subscriber further includes:
providing a peripheral device coupled to a telephone network by which a service subscriber can update call forwarding information included in said customer record via telephone.

* * * * *